United States Patent

[11] 3,600,882

| [72] | Inventor | Bernard C. Eisenberg<br>Rockaway, N.J. |
|---|---|---|
| [21] | Appl. No. | 794,054 |
| [22] | Filed | Jan. 27, 1969 |
| [45] | Patented | Aug. 24, 1971 |
| [73] | Assignee | Solbern Corporation<br>Fairfield, N.J. |

[54] CUCUMBER HARVESTER
34 Claims, 15 Drawing Figs.

| [52] | U.S. Cl. | 56/327 |
|---|---|---|
| [51] | Int. Cl. | A01d 45/00 |
| [50] | Field of Search | 56/327, 1;<br>171/27 |

[56] References Cited
UNITED STATES PATENTS

| 2,841,947 | 7/1958 | Grew | 56/327 |
|---|---|---|---|
| 2,893,193 | 7/1959 | Gilbert | 56/327 |
| 3,084,496 | 4/1963 | Leonard et al. | 56/327 |
| 3,277,605 | 10/1966 | O'Brien | 56/376 X |
| 3,331,197 | 7/1967 | O'Brien | 56/327 |
| 3,365,869 | 1/1968 | Whiteley | 56/327 |
| 3,386,236 | 6/1968 | Mitchell | 56/327 |
| 3,427,794 | 2/1969 | Burton | 56/327 |

*Primary Examiner* — Russell R. Kinsey
*Attorneys* — Kenyon & Kenyon and Reilly, Carr & Chapin

ABSTRACT: A method of and apparatus for harvesting cucumbers from a vine wherein means are provided for lifting the vines from the ground and conveying them through the machine at a speed relative to the machine and substantially equal and opposite to the speed of the machine relative to the ground, whereby the vines may be passed through the machine without disturbance of their root end. The vines are engaged and passed through the machine to a reciprocating striking member. As the vines slidably pass through the machine, the striking member engages the matured cucumbers and peels the stem therefrom which attaches the cucumbers to the vines. The severed cucumbers are subsequently conveyed to a storage member toward the rear of the machine.

INVENTOR
BERNARD C. EISENBERG
BY
Kenyon & Kenyon
ATTORNEYS

CUCUMBER HARVESTER

CROSS REFERENCES TO RELATED APPLICATION

My copending application for Letters Patent, Ser. No. 464,651, now U.S. Pat. No. 3,457,711 filed June 17, 1965, discloses a cucumber-harvesting machine of the same general purpose to which the invention herein is directed.

BACKGROUND OF THE INVENTION

This invention relates to a machine for harvesting vegetables and fruit from vines and, more particularly, to a machine for harvesting cucumbers.

When harvesting a crop which matures several times during a growing season, care must be taken to remove the matured fruit without disturbing the rest of the fruit and the plant, and in particular, leaving the root system of the plant undisturbed. An example of this is found in the harvesting of cucumbers. During the growing season, cucumbers mature over a period of weeks and must be harvested to permit further crops to grow from each of the vines. Cucumber vines grow close to the ground and contain thereon leaves which partially hide the matured cucumbers and render it difficult to hand pick such a crop. Furthermore the vines grown in random directions and are easily damaged by rough handling. Recent attempts have been made to mechanize the harvesting of such a crop, particularly in view of the difficulty to obtain workers to handpick the crop.

In attempting to mechanize the harvesting, it has been discovered that the random orientation of the vines may be controlled by training them to grow in a predetermined direction with respect to the row in which they are planted. The vines may also be further positioned in a uniform orientation by means of a forced air supply being directed thereat. With the vines growing in uniform directions, it has become possible to attempt to harvest the crop by mechanized means. Certain machines included in the prior art attempted to grasp the cucumbers between elastic or cushioned members and then pull the cucumbers from the stem. Frequently, such a machine injures the vine when attempting to pull the cucumber from the stem because of the strong attachment therebetween. Other machines provide means for shaking and bumping the cucumbers to cause them to be severed from the stem. Such machines included in the prior art have been either complex and subject to frequent failures, or they did not provide positive removal of the crop without any damage to the vine.

SUMMARY OF THE INVENTION

The invention herein disclosed, in general, provides a machine which may be driven across a row of vines, engage and lift the vines into the machine, sever the matured cucumbers therefrom, and reposition the vines on the ground without causing any damage thereto. The vines are initially engaged by a plurality of resilient rollers, lifted from the ground and placed on a conveying means which is adapted to operate substantially at an equal and opposite speed to that of the machine being passed over the vines. In this way, the vines are passed through the machine without disturbing the root system since the relative velocity of the vines with respect to the ground is zero.

In one embodiment, a plurality of endless belts disposed parallel to the path of travel of the machine have conveying means thereon for passing the vines through the machine. Spaced above and transverse to the conveying belts is a striking member which cyclically descends and imparts a blow to the cucumber to sever it from the vine. The cucumber drops into a trough and is subsequently conveyed to a storage member.

In another embodiment, a supporting means engages the vines near the root end thereof, and the vine is then permitted to slide thereacross. Preferably, this supporting means is disposed angularly from the direction travelled by the machine. An elongated member which is adjustably spaced from the supporting means and positioned parallel thereto may be utilized. The spacing between the elongated member and the supporting means is adjusted to permit passage of the vines and the unmatured cucumbers back to the ground. Cucumbers that are matured and ripe for harvesting are passed into engagement with the supporting means and rendered a downward blow thereat to facilitate severing the cucumber from the vine. A striking means or impact member again capable of a cyclically type motion is positioned above the supporting means and during its stroke strikes the cucumber and severs it from the vine. The vine is then permitted to pass through the spacing and is repositioned on the ground without any disturbance to its root system.

The principal advantage made possible by the use of this invention over the prior art machines is that the cucumber may be readily severed from the vine without the usual concomitant damage caused to the vine. Since the vines are guided through the machine and are moved so that their ground velocity is zero, no disturbance to the root system is encountered. Further, positive removal of the cucumber from the vine is facilitated by means of the impact member. The stroke of the impact member is controlled such that the blow rendered to the cucumber is insufficient to render any damage thereto. Utilization of the machine disclosed herein permits the entire crop of cucumbers above a predetermined size to be harvested and the vines replaced on the ground without any damage thereto. Therefore, several crops may be harvested during the growing season with the entire harvesting operation conducted in a minimum of time.

Accordingly it is a primary object of this invention to provide a simple and effective machine to harvest cucumbers.

A further object of this invention is to provide a machine for harvesting cucumbers without damaging the vines upon which they are growing.

It is another object of this invention to provide a machine for harvesting cucumbers which is selective in those cucumbers being picked.

Another object of this invention is to provide a machine for harvesting cucumbers wherein the matured cucumbers are severed from the vines by means of an impact blow.

These and other objects, advantages and features of the invention will become more apparent from the following description taken in conjunction with the accompanying drawings wherein:

FIG. 9 is an enlarged perspective view of the second embodiment of the cucumber harvester engaging a plurality of vines;

Figure 1:
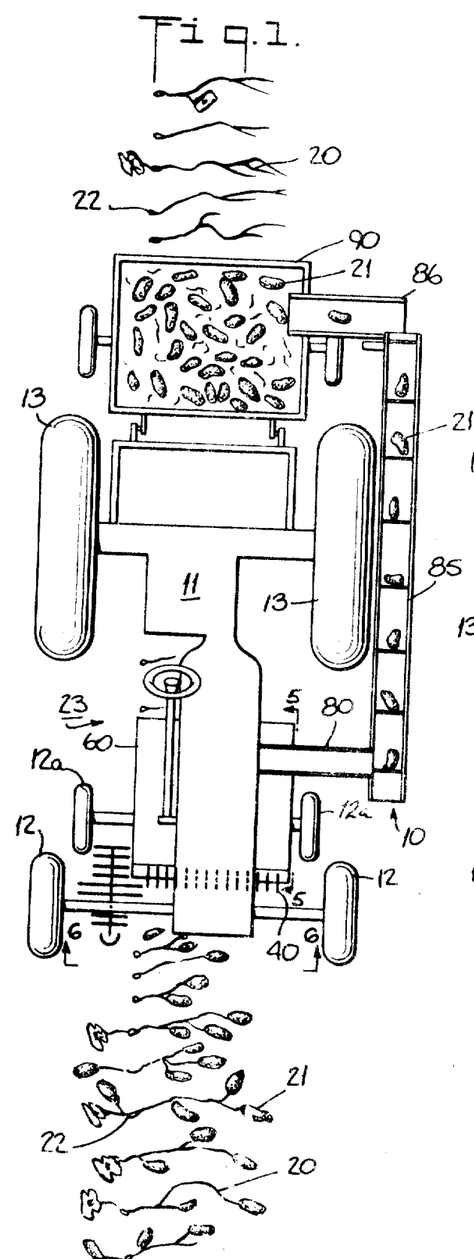
FIG. 1 is a plan view of a first embodiment of the cucumber harvester positioned over a uniformly orientated row of cucumber vines.

Referring to the drawings, FIG. 1 depicts a first embodiment of the cucumber-harvesting machine 10 as an integral part of a tractor 11. The tractor 11 is driven across a row of uniformly oriented vines 20 having attached thereto a plurality of cucumbers 21. The vines 20 have been trained to grow substantially in one direction extending away from the root end 22. The wheels 12 and 13 of the tractor 11 are spaced at intervals sufficient to straddle the vines 20 of a given row. Thus, as illustrated in FIG. 1, the line of travel of the machine is substantially at right angles to the direction at which the vines 20 are trained. The cucumber-harvesting machine 10 consists basically of a vine-lifting means 40 suspended at the front end of the tractor 11 and positioned to engage the vines 20. Behind the lifting means 40 is a conveying means 60 which passes the vines through the machine in a rearward direction during the harvesting operation. A trough 80 is positioned below conveying means 70 and passes the harvested cucumbers to another conveying means 85 which provides a means for elevating the cucumbers so that they may be stored in the bin 90. Interposed between conveying means 85 which elevates the cucumbers and the bin 90 may be provided in intermediate chute or conveying means 86 as shown. The forward portion of the cucumber-harvesting assembly may be attached to the tractor by brackets or supports at various positions. Preferably, the support axles of the forward rollers 41 and the rearward drum 64 have bearing support members directly fastened to the tractor frame.

Figure 2:
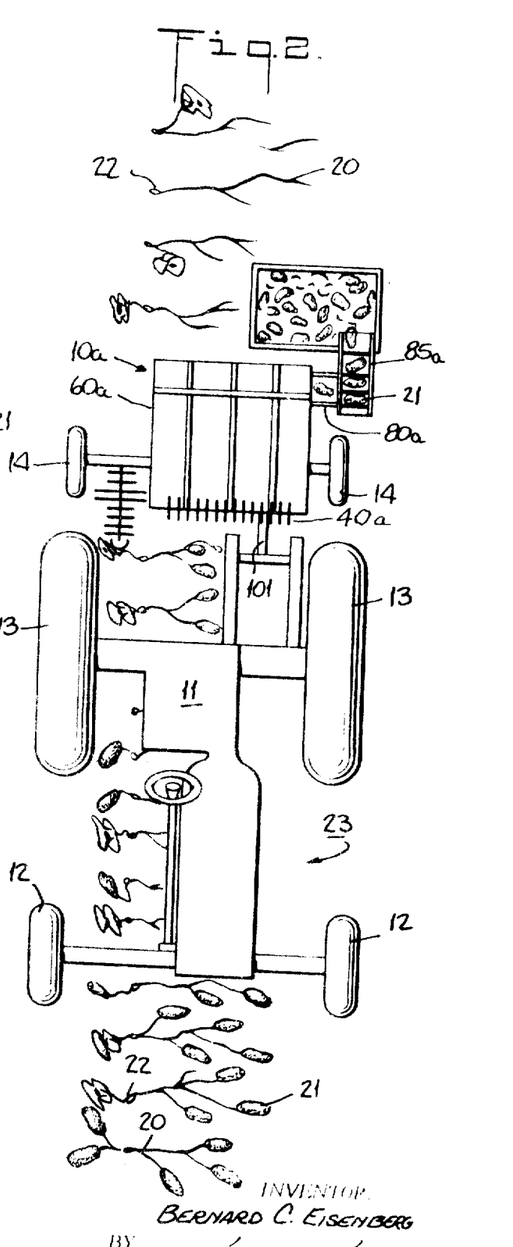
FIG. 2 is a plan view of the machine of the first embodiment attached to a tractor passing over a uniformly orientated row of cucumber vines.

Alternatively, the identical basic elements of the machine depicted in FIG. 1 may also be arranged into a separate harvesting machine which is adapted to be attached to the rearward end of a tractor 11. As seen in FIG. 2, the tractor 11 again has its wheels 12 and 13 straddling the row of vines 20 and moves in a direction transverse to the manner in which the vines have been trained to grow. The cucumber-harvesting machine indicated generally at 10a is attached at the rear of the tractor 11 by means of the adapter 101 and again has a vine lifting means 40a disposed to engage the vines 20. A conveying means 60a is disposed at the rearward end of the lifting means 40a and engages and passes the vines 20 rearwardly. A trough 80a passes the cucumbers 21 again in a sideward direction to conveying means 85a so that they may be stored in the bin 90a. The configuration depicted in FIG. 2 differs from that of the machine of FIG. 1 only with respect to the length of conveying means 85a. The chute or conveying means 86 may be eliminated in this configuration and provides a more compact and easily handled unit. For the purpose of brevity, the first embodiment described in the remaining figures will be the integral unit illustrated in FIG. 1.

With reference to FIGS. 3, 4, 5 and 6, the vine-lifting means 40, disposed at the rearward end of the tractor 11, has a plurality of resilient rollers 41 which travel along the ground 23. Each of the resilient rollers 41 has a plurality of undulations 42 along the periphery thereof. These undulations 42 provide a means for engaging the vines and cucumbers since the rollers rotate in the direction of the arrows in FIGS. 3 and 5, and raise the vines upwardly upon the conveying means 60. The conveying means 60 comprises a plurality of endless belts 61 which have thereon resilient projections 62 for engaging the cucumber vines. The belts 61 are spaced from one another and provide a means for transporting the vines with the cucumbers hanging therefrom as they are being rearwardly conveyed. Each of the endless belts 61 passes over a forward pulley 63 and a rear drum 64. The drum 64 is driven by the harvester machine drive wheels 12a in the direction indicated by means of the chain to sprocket drive 65. By being driven directly by ground engaging wheels, the conveying means 60 will be moved rearwardly at a speed equal and opposite to that of the tractor. This insures that the vines will not have their root system disturbed since the speed at which they are being conveyed relative to the ground is zero.

Figures 3, 4:
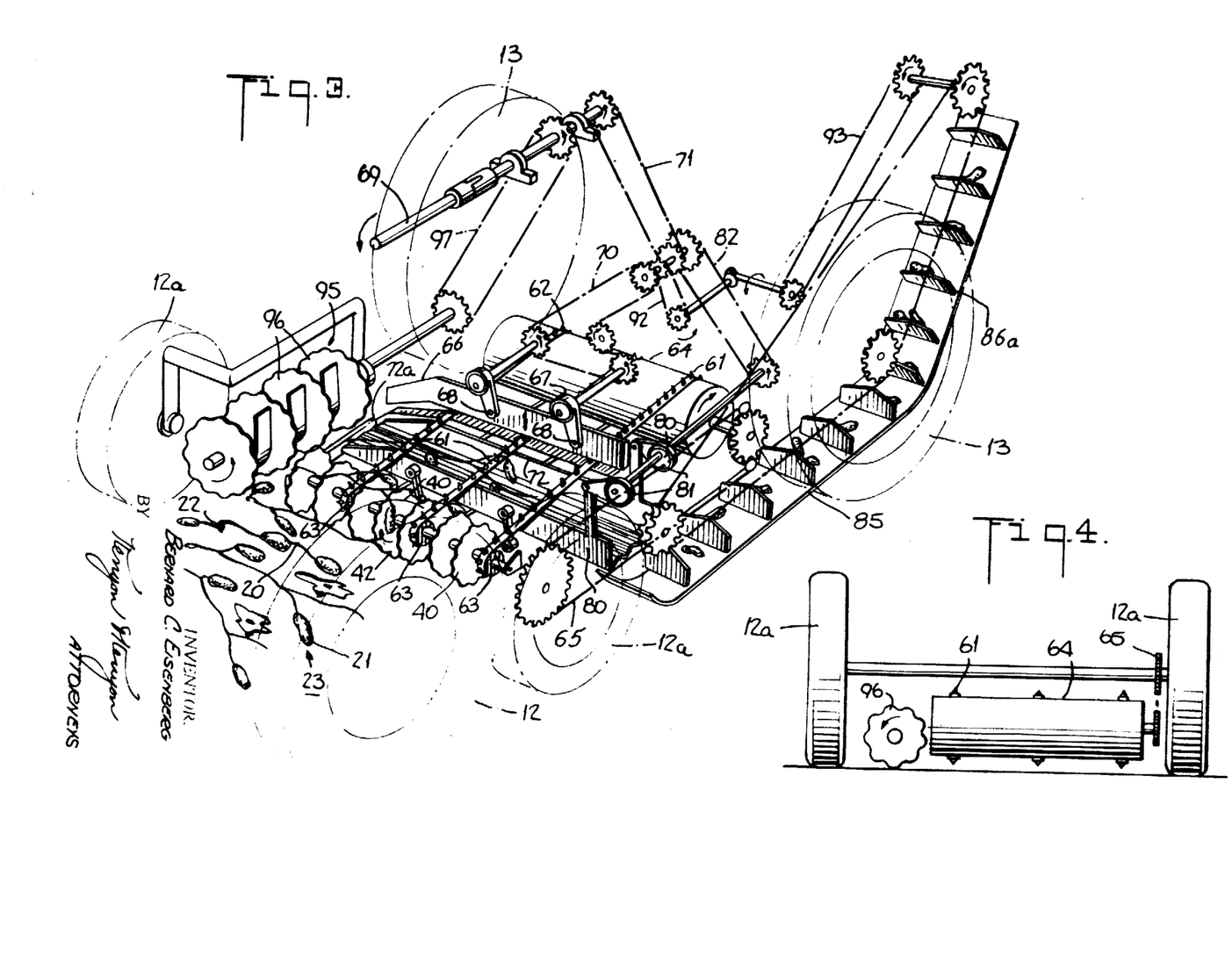
FIG. 3 is an enlarged perspective view of the first embodiment of the cucumber harvester engaging a plurality of vines with the storage bin omitted.
FIG. 4 is a partial front elevation view of the vine-conveying means drive mechanism of the first embodiment of the invention.
Figure 5:
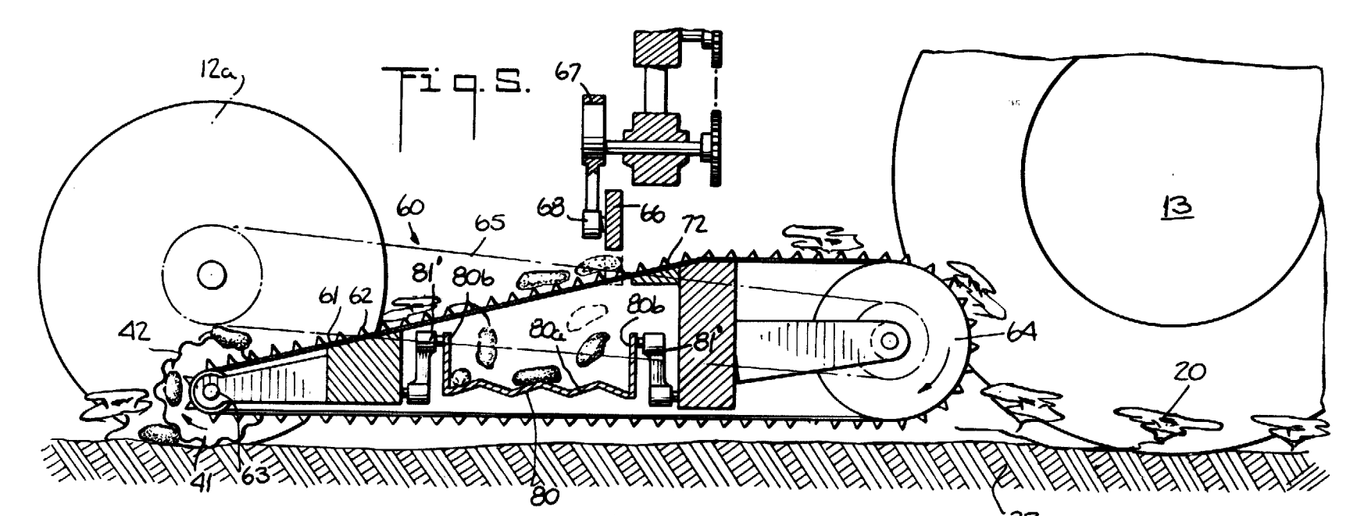
FIG. 5 is a partial side elevation view of the vine conveying means of the machine of the first embodiment taken along the line 5—5 of FIG. 1.

Spaced above the conveying means 60 is a striking member 66 which engages and severs the cucumbers from the vines (FIGS. 3 and 5). The striking member 66 is positioned transverse to the direction of the tractor's travel and is driven in a cyclic or reciprocating manner in the vertical direction. A pair of eccentric drives 67 are pivotally attached to the striking member at 68. The eccentric drives 67 are driven in a counterclockwise direction as viewed in FIG. 3 by a main drive shaft 69 which is powered by the tractor; the eccentric drives 67 are connected to the main drive shaft 69 by a pair of chain sprocket drives 70 and 71. Spaced below the striking member 66 is a stationary supporting bar 72 (FIGS. 3 and 5) which extends parallel to and slightly offset from the striking member 66. As the vines 20 are moved rearward and pass over the stationary bar 72, the cucumbers are being dragged thereover by the vines 21 on the conveying means 60. When the striking member 66 descends and engages the cucumbers, the stem attaching the cucumbers to the vines are severed or peeled from the cucumbers. The supporting bar 72 has its main body transverse to the direction of machine travel, and has an arm 72a bent perpendicular thereto which engages and supports the vines near their root end.

Figure 6:
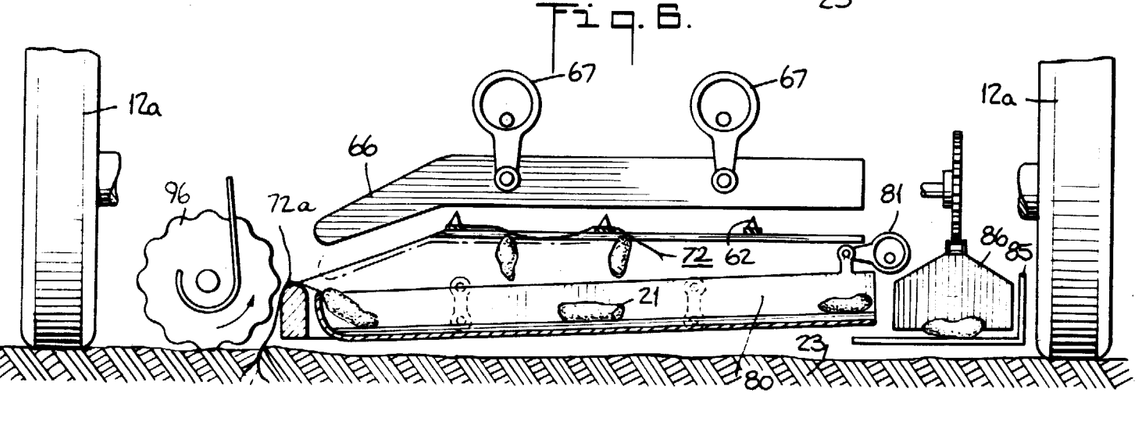
FIG. 6 is a partial front elevation view of the first embodiment of the cucumber harvester striking mechanism taken along the line 6—6 of FIG. 1.

Once the cucumbers are removed from the vine, they fall downward into the trough 80 (FIG. 5). The trough 80 has a serrated bottom 80a and upwardly extending sidewalls 80b supported by pivoted links 81' (FIG. 5). The trough 80 is driven on each side by an eccentric drive 81 to cause a reciprocating motion which will cause the cucumbers to move downward the conveying means 85 and fall therein through the open end of the trough 80 (FIG. 6). Eccentric drive 81 is again driven from the main shaft 69 by the chain sprocket drives 82 and 71 (FIG. 3).

Once the cucumbers are on the conveying means 85, they are carried upward into the storage bin 90 by means of the members 86a. The conveying means 85 is again driven from the main shaft 69 in the direction indicated through the chain sprocket drives 92, 93 and 71.

To assist the proper orientation of the vines 20 as they are being conveyed, a sweep attachment 95 may be provided on the forward end of the tractor (FIGS. 3, 4 and 6). The sweep attachment 95 comprises a plurality of resilient rollers 96 of a configuration similar to those at 42. A chain sprocket drive 97, again driven from the main shaft 69, rotates the rollers 96 counterclockwise. By rotating these resilient rollers 96 in the direction indicated in FIGS. 3, 4 and 6, a sweeping type of action is provided which insures that the vines are uniformly orientated as they are being conveyed toward the striking member 66. The sweep attachment may be provided with a means for lifting it out of engagement from the ground when the tractor is being driven across an open field.

Figure 7:
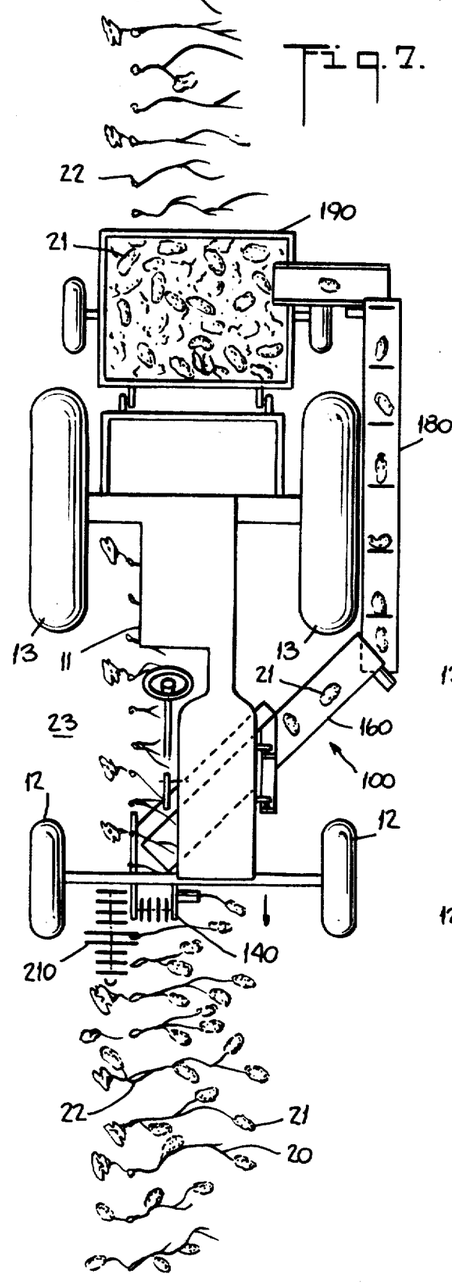
FIG. 7 is a plan view of a second embodiment of the cucumber harvester positioned over a uniformly oriented row of cucumber vines.

Referring now to the second embodiment, FIG. 7 like FIG. 1 depicts the cucumber-harvesting machine 100 as an integral part of a tractor 11. The cucumber-harvesting machine 100 of the second embodiment consists basically of a vine-lifting means 140 suspended from the front end of the tractor 11 and positioned to engage the vines 20 near their root ends 22. Attachment to the tractor is accomplished at the points indicated in FIG. 9 as being fixed as well as other intermediate attachments preferably adjacent the forward resilient rollers. Angularly disposed behind the lifting means 140 is a conveying means 160 which passes the vines and subsequently the harvested cucumbers through the machine in a rearward direction during the harvesting operation. Another conveying means 180 is positioned at the rearward end of the conveying means 160 and provides a means for elevating the cucumbers so that they may be stored in the bin 190.

Figure 8:
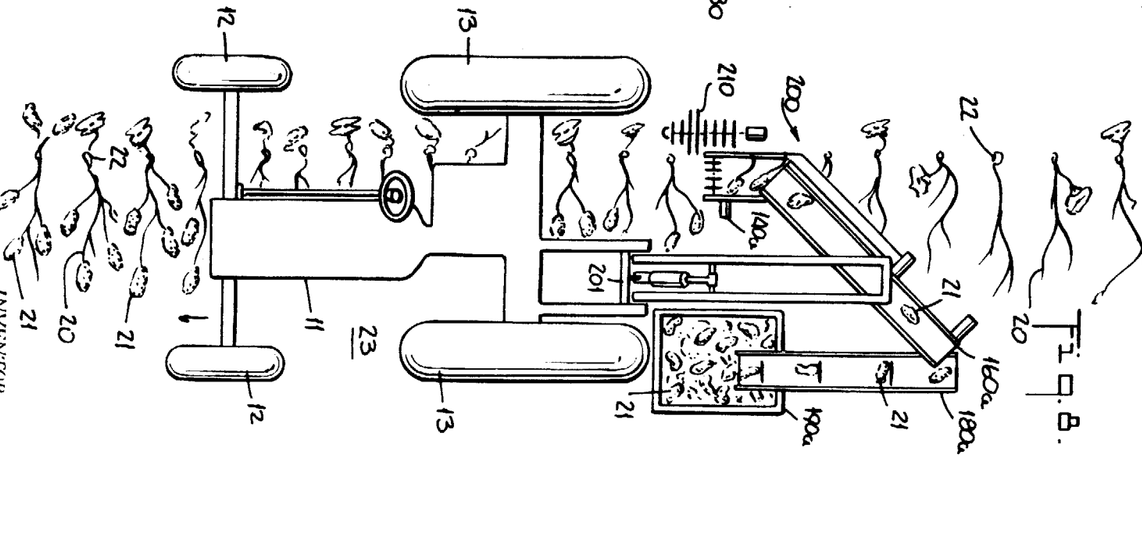
FIG. 8 is a plan view of the machine of the second embodiment attached to a tractor passing over a uniformly oriented row of cucumber vines.

Alternatively, the identical basic elements of the machine depicted in FIG. 7 may be arranged into a separate harvesting machine which is adapted to be attached to the rearward end of a tractor 11. This configuration is depicted in FIG. 8 and the machine functions similar to that of FIG. 2. The tractor of FIG. 8 may be modified to provide the entire support for the harvesting machine or the machine may be provided with ground supporting wheels and couplings as desired. The cucumber-harvesting machine indicated generally at 200 is attached at the rear of the tractor 11 by means of the adapter 201 and again has a vine-lifting means 140a disposed to engage the vines 20 near their root ends 22. A conveying means 160a is disposed at the rearward end of the lifting means 140a and engages and passes the vine 20 and subsequently the detached cucumbers 21 in a direction angularly disposed from the path of the tractor 11. Another conveying means 180a moves the cucumbers 21 in a forward direction and elevates them so that they may be stored in the bin 190a. The configuration depicted in FIG. 8 differs from that of the machine of FIG. 7 only with respect to the orientation of the conveying means 180a. The conveying means 180a is positioned to move the cucumbers forward to the bin 190a to provide a more compact and easily handled unit. For the purpose of brevity, the second embodiment described in the remaining figures will be the integral unit illustrated in FIG. 7.

Figure 10:
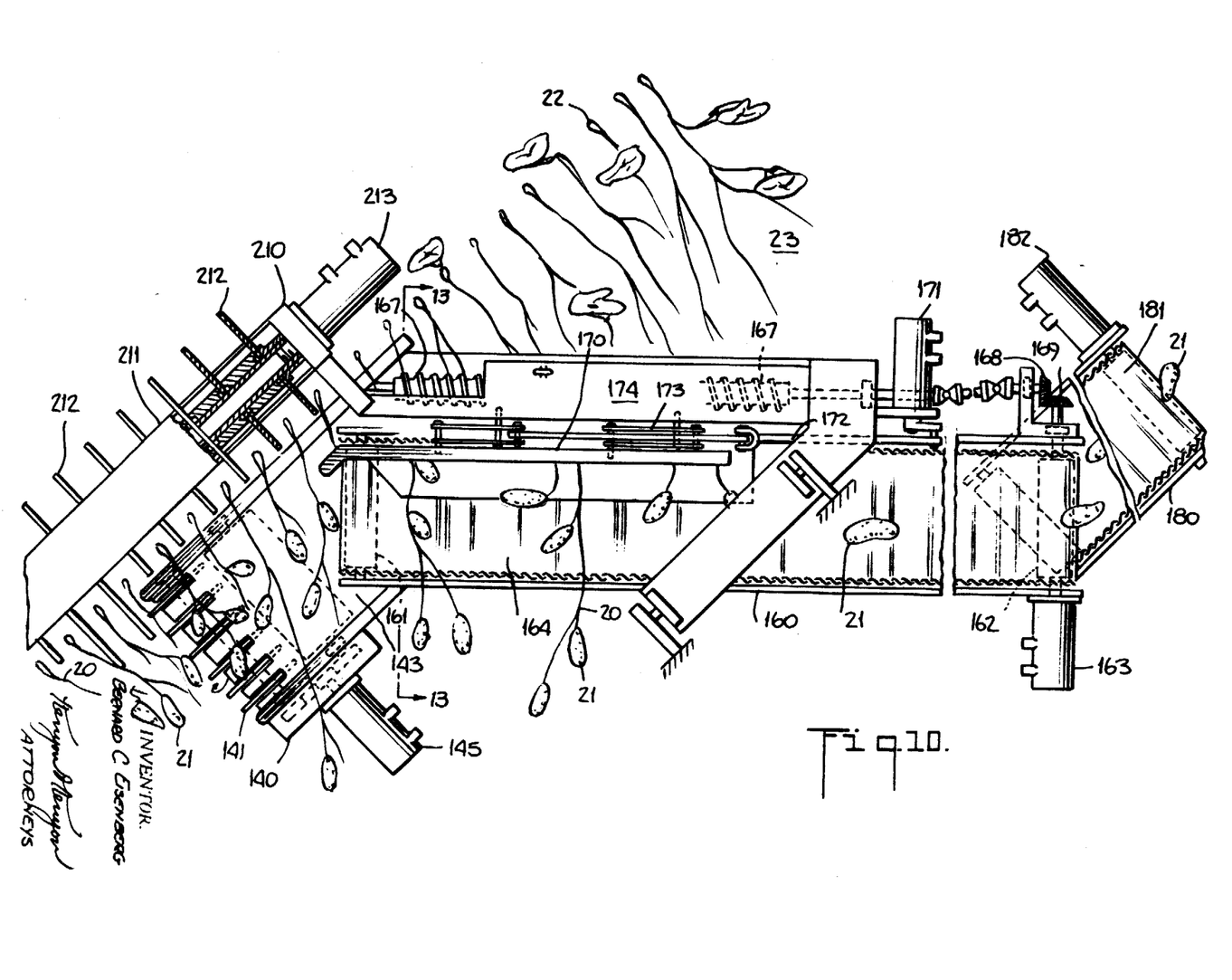
FIG. 10 is an enlarged plan view having parts broken away and shown in section of the lifting and conveying means provided on the machine of the second embodiment.
Figure 11:
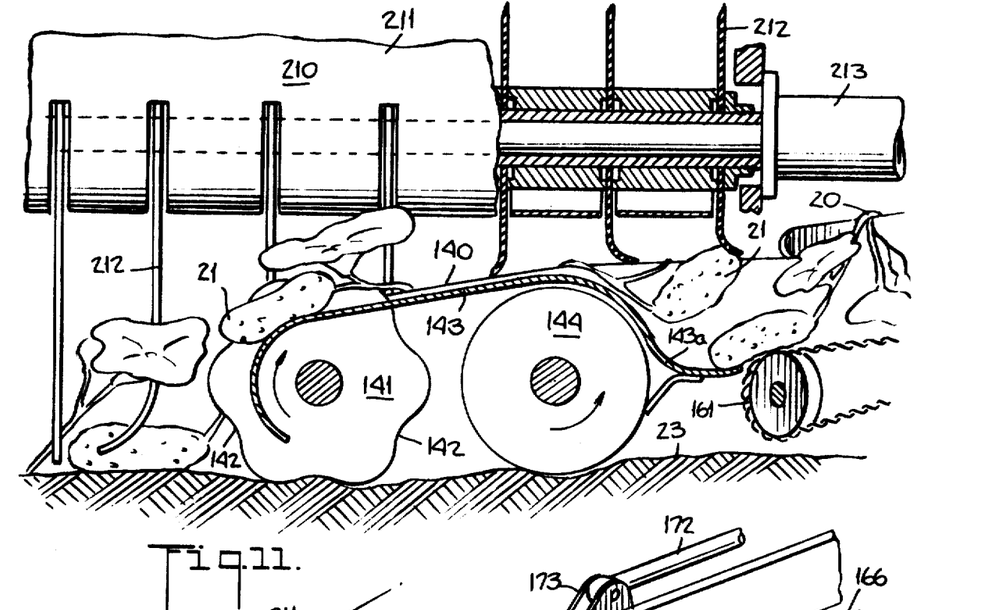
FIG. 11 is a fragmentary elevation view having parts broken away and shown in section of the lifting means and the sweeping attachment provided on the machine of the second embodiment.
Figure 12:
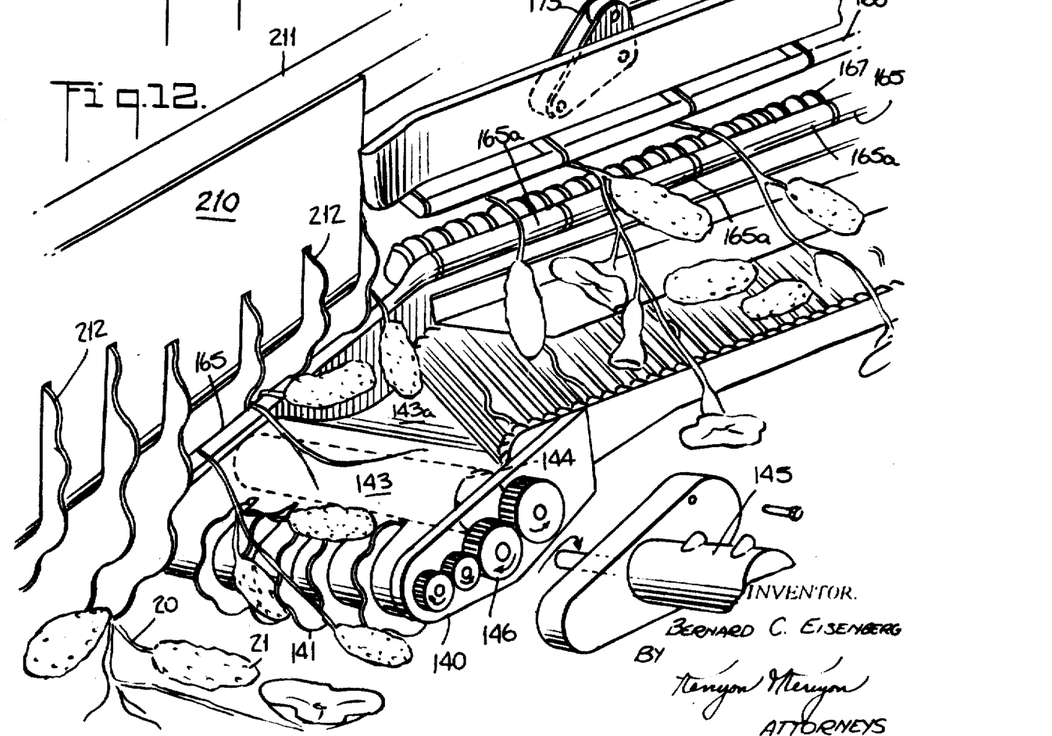
FIG. 12 is a fragmentary perspective view of the cucumbers being engaged by the lifting means and passed through the spacing provided between the supporting means and impact member provided on the machine of the second embodiment.

With reference to FIGS. 9, 10, 11 and 12, the vine-lifting means 140, disposed at the forward end of the tractor 11, has a plurality of resilient rollers 142 which travel along the ground 23. Each of the resilient rollers 141 has a plurality of undulations 142 along the periphery thereof. These undulations 142 provide a means for engaging the vines and cucumbers since the rollers rotate in the direction of the arrows in FIGS. 9–12 and raise the vines upon the upwardly inclined surface of chute 143. Spaced rearward of the resilient roller 141 is another roller 144 which is in rolling contact with the ground 23 and rotates with the same surface velocity as wheels 12 and 13 of the tractor. A drive motor 145 rotates the gearing system 146 which then rotates the rollers 141 and 144 in the directions indicated in the drawings. A drive means is preferable since it prevents the lifting means 140 from tending to dig into the ground 23. The upper surface of chute 143 provides a means for supporting and conveying the vines 20 rearwardly and on to the conveying means 160 (FIGS. 9, 10 and 12).

The conveying means 160 is disposed angularly in a lateral direction from the lifting means 140. At the front end of the conveying means 160 is an idler roller 161 (FIGS. 10 and 11) aligned with a rear roller 162. Roller 162 is engaged and rotated by a motorized drive means 163. A belt 164 is engaged about the rollers 161 and 162 and provides a means for initially conveying the vines having the cucumbers attached thereto and subsequently the severed cucumbers toward the next conveying means. Trough 143a (FIGS. 11 and 12) of chute 143 lowers the cucumber to be jacked up by conveying means 160 adjacent to roller 161.

The rear portion of the supporting bar 165 is positioned adjacent but slightly above and parallel to the conveying means 160 while the forward portion is formed to be parallel to the vine lifting means 140 at its forward end (FIGS. 9 and 12). The supporting bar 165 engages the vine 20 near its root end 22. As the vine 20 is elevated by the lifting means 140, it is subsequently guided onto the conveying means 160 by the supporting bar 165. When the vine is on conveying means 160, which is angularly disposed from the path of travel of the tractor 11, the vines 20 tend to slide across the supporting bar 165 and return to their original ground position. As the vines 20 pass across the supporting bar 165, the cucumbers attached thereto also tend to slidably pass thereacross. To aid the vines in sliding across supporting bar 165, a plurality of rotatable rollers 165a are adjacently spaced along the rearward portion thereof. Disposed above and parallel to the supporting bar 165 is a rotatable elongated bar 166 which is adjustably spaced therefrom. The spacing between the elongated bar 165 and the supporting bar 166 is adjusted so that the bar 166 engages the leaves and urges the vine to pass in contact with supporting bar 165. The bar 166 is pivotally mounted for vertical movement with respect to supporting bar 165 in order that bar 166 can be urged upwardly to clear any cucumber which is not separated from the vine.

Figure 13:
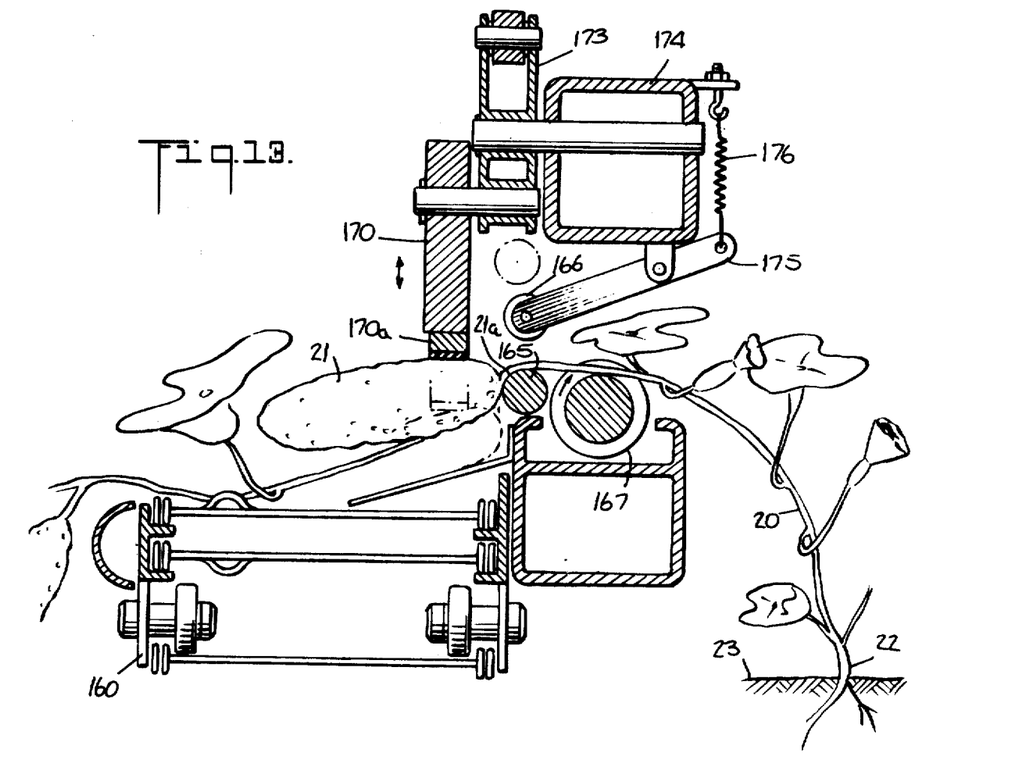
FIG. 13 is an enlarged fragmentary front elevation view of the reciprocating impact member provided on the machine of the second embodiment, taken along the line 13—13 of FIG. 10.

Positioned behind the supporting bar 165 and parallel thereto is a rotatable member 167 containing a helical thread thereon (FIGS. 10, 12 and 13). The vines are engaged in the groove portion of the thread and are fed rearwardly as the member 167 rotates in a manner similar to Archimedes' Screw principle. The rotatable member 167 is preferably operated at a speed such that the vines are fed at a speed equivalent to that of the belt 164. This is accomplished by driving the belt 164 and rotatable member 167 by the same motor 163. Bevelled gears 168 and 169 connect the shaft of the rotatable member 167 to the motor 163 and impart the desired rotation thereto.

In order to facilitate the removal of the cucumber from the vine, an impact member 170, capable of reciprocating-type motion in a substantially vertical direction, is provided (FIGS. 9, 10 and 12–14). The impact member 170 is paced on the conveying means side of the supporting bar 165 and strikes the cucumber 21 as it approaches the supporting bar. The impact member 170 engages the upper surface of the cucumber 21 as the stem 21a of the cucumber bears upon the supporting bar. As a result, with the stem 21a bearing upon the supporting bar 165 and the cucumber being forced by the impact member 170 in a downward direction, the stem is subjected to a peeling action which separates the stem from the cucumber without affecting the connection of the stem to the vine. To avoid damaging the cucumber, the impact member 170 is provided on the lower surface thereof with a foam rubber or sponge-type pad indicated at 170a. Due to the laterally angled position of the supporting bar 165 and the impact member 170, each of the vines is progressively passed between these members. As a result, the cucumbers are progressively removed from each vine without entangling or otherwise damaging the vines.

Figure 14:
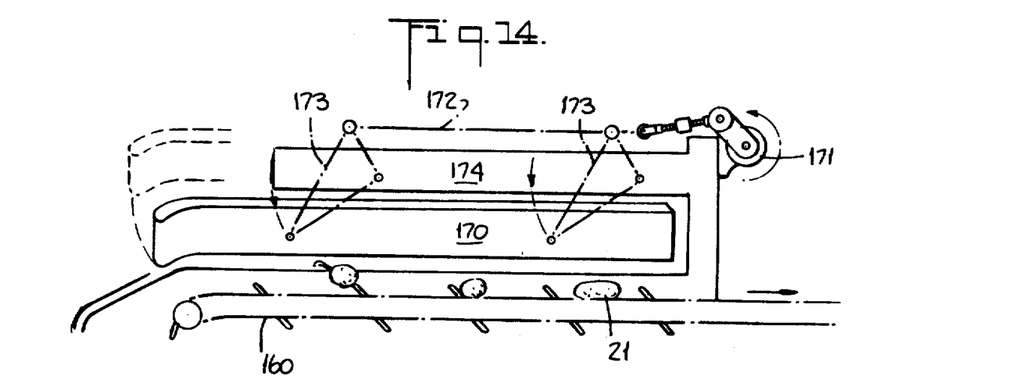
FIG. 14 is a fragmentary elevation view of the reciprocating impact member drive mechanism provided on the machine of the second embodiment.

As illustrated in FIG. 14, a motor 171 is used to drive the connecting rod 172. A connecting member 173, illustrated in FIG. 14 by the dashed lines, is pivotally mounted to the stationary arm 174, and attached to the connecting rod 172 and impact member 170. As the motor 171 rotates in a counterclockwise direction, the movement of the connecting rod 172 imparts a substantially vertical reciprocating-type motion to the impact member 170 as indicated by the arrows in FIG. 14.

Referring again to FIG. 13, the elongated bar 166 is pivotally mounted to the stationary member 174 by means of a lever arm 175. A spring 176 attached to one end of lever arm 175 permits vertical adjustment of the elongated bar 166. By adjustment of the spring 176, the downwardly biased elongated bar 166 may be adjusted to any particular spacing from the supporting bar 165. Because of its spring mounting, the elongated bar 166 is permitted to be raised upward, as indicated by the dotted line, to allow passage of a cucumber that has not been removed from the vine by the impact member 170 and the peeling action previously discussed. This insures return of the vine 20 to its ground position without any damage.

As indicated in FIGS. 9 and 10, another conveying means 180 is disposed at the end of conveying means 160 and is used to elevate the cucumbers 21. Again, an endless belt 181 is disposed about a forward and rear roller. A motorized drive member 182 is provided to move the conveying belt 181. The conveying means 180 is upwardly inclined and contains a plurality of retaining members 183 to hold the cucumbers as they are being elevated and dropped into the storage bin 190.

As indicated in FIG. 9, the storage bin 190 is mounted on a pair of wheels 191. On the forward end of the storage bin 190 is attached a hydraulic piston 192, which when activated pushes the bin rearwardly away from the tractor 11, as indicated by the dashed lines. This movement of the bin permits the harvested cucumbers contained therein to be readily removed from the machine.

The cucumber harvester 100 may further be provided on its forward end with a sweep attachment 210, illustrated in FIGS. 9–12. The sweep attachment 210 comprises a frame member 211, having amounted on the bottom thereof a plurality of resilient rollers 212. The rollers 212 are designed similar to those utilized on the lifting means and indicated at 141. A motor 213 is connected to the rollers 212 and imparts the desired rotation thereto. As illustrated in FIGS. 7 and 8, the sweep attachment 210 is placed adjacent the vine-lifting means 140 with the rollers being positioned transverse to the direction of machine travel. By rotating these resilient rollers 212, a sweeping type of action is provided which insures that the vines are uniformly oriented in the proper direction prior to their engagement by the vine-lifting means 140. The rollers 212 are provided with differing diameters and are positioned contiguous to the vine-lifting means 140 to assist in properly orientating the vines as they are conveyed across the vine-lifting means 140. Since it would be undesirable to have the sweep attachment 210 engage with the ground as the cucumber harvester is being driven across an open field or road, means are provided for lifting the frame member 211 out of engagement with the ground. A hydraulic piston 214 is attached to a pivot member 215 which has its other end attached to the frame member 211 by means of a chain 216. Activation of the hydraulic piston 214 provides a simple and expedient means for lifting and disengaging the sweep attachment 210 from the ground.

Figure 15:
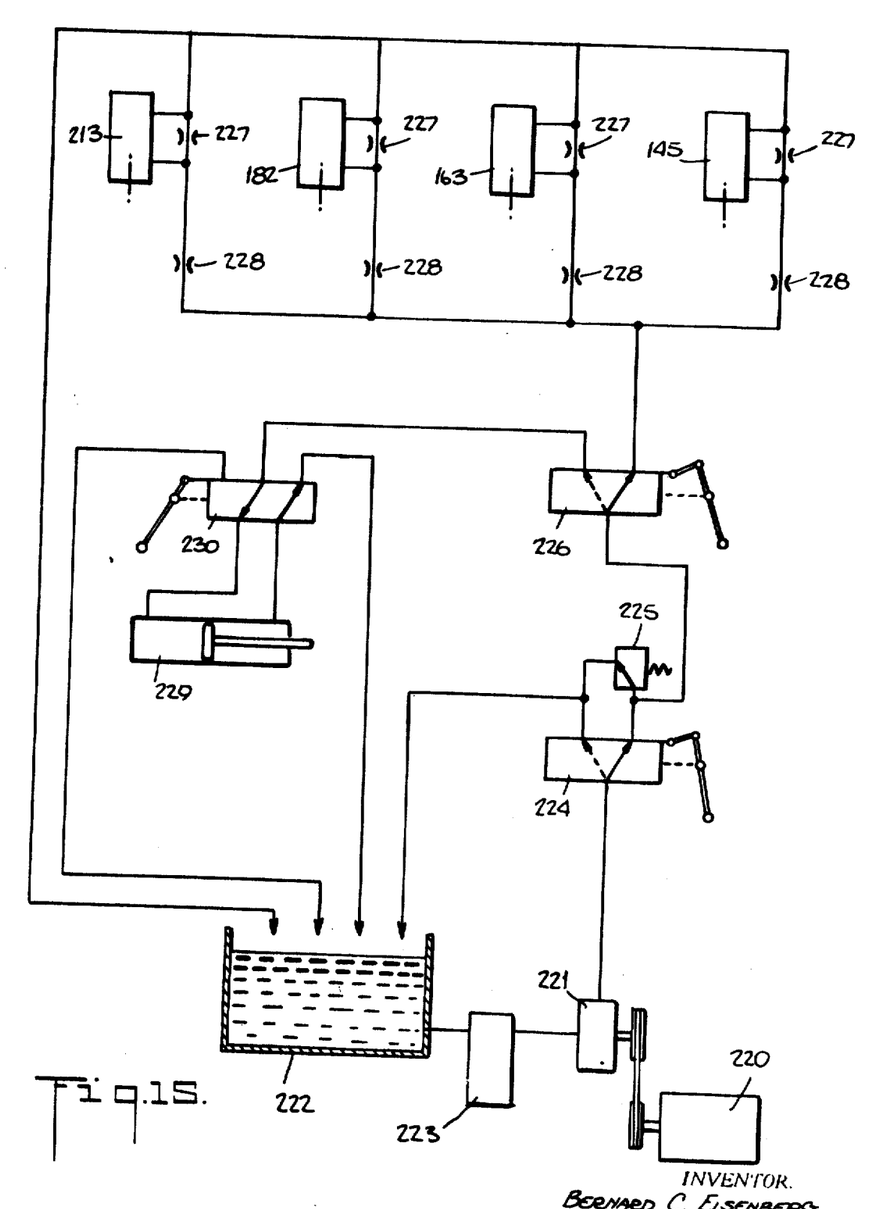
FIG. 15 is a schematic view of the hydraulic drive means provided on the machine of the second embodiment.

FIG. 15 schematically illustrates the hydraulic system provided to drive the motorized means previously discussed. A gasoline driven engine 220, preferably the tractor engine, is connected to and drives pump 221. Liquid is supplied to the pump 221 from the reservoir 222 by a connection extending through filter 223. On the output side of the pump 221 is a system on-off valve 224, having a pressure relief valve 225 associated therewith. As system pressure becomes excessive, pressure relief valve 225 routes the fluid back to the reservoir 222. Another valve 226 permits the system to be switched either into the motor operation phase or the piston operation phase. With the switch valve 226 in the position indicated, the shunted motors 145, 152, 182 and 213 are operated. Each motor is shunted by means of the flow control valve 227 and contains an additional adjustable flow control valve 228 in its line. Valves 227 prevent destructive torques from being exerted by the motors if a mechanical jamming should occur. Flow control valves 228 are provided to enable the speed of each motor to be selectively controlled. The motors 145, 163, 182 and 213 function to activate the vine-lifting means 140, operate conveying means 160, operate conveying means 180 and rotate sweep attachment 210, respectively. When valve 226 is turned to the left or dotted position, the fluid is diverted to the double-acting hydraulic piston 229. The switching valve 230 permits piston 229 either to activate the sweep attachment lifting means or provide for the pivoting of the storage member 190. In lieu of the hydraulic driving herein described, it is recognized that equivalent electrical or mechanical drive members may be readily substituted.

While certain embodiments of the invention have been shown and described herein, it is to be understood that changes, additions and substitutions can be made without departing from the scope and spirit of the invention.

I claim:

1. A machine for harvesting fruit attached by stems to ground vines which have the root end thereof planted in a row with the vines trained in a direction extending at a predetermined angle to the row, the machine harvesting the fruit as the machine is moved along the row, the machine comprising:
    a. means for conveying the vines above the ground relative to the machine as the machine moves along the row;
    b. means underlying the path of conveyance of the vines and extending at an angle with respect to the row for supporting the vines and the stems attached thereto as the vines are conveyed;
    c. means for cyclically striking fruit being conveyed to adjacent said supporting means as the stem attaching the fruit is conveyed adjacent said supporting means, said striking means cyclically descending to a position extending substantially parallel and adjacent to the entrance side of said supporting means and engaging the fruit thereat, the striking of the fruit causing the stem engaged with said supporting means to be peeled from the fruit, and
    d. means adjacent said striking means for receiving the fruit removed from the vine.

2. A machine in accordance with claim 1 in which said conveying means extends substantially in a rearward direction with respect to the line of travel of said machine.

3. A machine according to claim 2 wherein said conveying means includes a plurality of endless belts having paths of travel parallel and adjacent to one another, said belts containing thereon a plurality of resilient projections to engage the vines as they are being conveyed through the machine.

4. A machine according to claim 1 wherein said means for supporting the vines comprises a stationary bar positioned transverse to the direction of the path of the machine and disposed under said conveying means to provide a support for the vines and the stems attached thereto as said striking means causes the fruit to be severed therefrom.

5. A machine according to claim 1 wherein said striking means comprises an elongated bar extending at an angle to the direction of the path of the machine, said striking means being cyclically moved in a vertical direction.

6. A machine according to claim 5 wherein said elongated bar extends substantially perpendicular to the direction of the path of the machine.

7. A machine according to claim 5 wherein the fruit-engaging surface of said elongated bar is a resilient material to prevent damaging the fruit as it is peeled from the stem.

8. A machine according to claim 5 wherein said supporting means comprises a stationary elongated member disposed substantially adjacent and parallel to the rearward side of said striking means when said striking means is in a descended position, said stationary member providing a support for the vines and the stems attached thereto as the engagement of said striking means with the fruit causes the fruit to be peeled from the stems.

9. A machine according to claim 8 wherein said stationary bar extends substantially perpendicular to the direction of the path of the machine.

10. A machine according to claim 8 wherein said stationary bar further includes a plurality of rollers mounted thereon along at least a portion of the length thereof.

11. A machine according to claim 1 wherein said receiving means comprises an inclined trough disposed below said striking means.

12. A machine according to claim 1 wherein said receiving means comprises a trough disposed below said striking means, said trough having a serrated bottom and a pair of upwardly extending sidewalls, and means for moving said trough to cause the cucumbers received therein to be slideably removed therefrom.

13. A machine according to claim 12 which further includes a second conveying means disposed adjacent to said trough, and a storage member disposed at the end of said second conveying means.

14. A machine according to claim 1 which includes means for engaging and lifting the vines extending substantially transverse to the direction in which the machine moves, said engaging means including a plurality of resilient rollers disposed along an axis extending transversely to the path of travel of the machine, said rollers having a plurality of indentations along the periphery of each for engaging and lifting said vines.

15. A machine according to claim 14 wherein said supporting means underlie the path of conveyance of the vines along the machine and extend transversely with respect to the row at an angle to the direction in which the vines are trained for successively supporting different portions of the length of the vines as the vines are conveyed with respect thereto, said supporting means being angularly disposed from said engaging means and parallel to said striking means.

16. A machine according to claim 15 wherein said means for conveying the vines comprises a first conveying means associated with said means for engaging and lifting said vines, a second conveying means extending from said first conveying means, and a third conveying means extending upwardly from said second conveyor means and terminating at a means for collecting the harvested fruit, said first and third conveying means being substantially parallel to said means for engaging and lifting said vines and said second conveying means being angularly disposed from said means for engaging and lifting said vines and positioned substantially parallel to said supporting means.

17. A machine according to claim 15 which includes an elongated member spaced above and parallel to said supporting means at a distance which permits passage of unmatured fruit and vines to be passed therethrough and repositioned on the ground, said elongated member being downwardly biased and having means associated therewith to permit adjustment of the spacing between said elongated member and said supporting means.

18. A machine according to claim 15 which includes a rotatable member spaced adjacent to said supporting means and containing thereon a helical thread for horizontal engagement and feeding of said vines, said rotatable member being operated at a speed so that said vines being fed by said helical thread are moved at a speed substantially equal to that of said conveying means spaced adjacent thereto.

19. A machine according to claim 1 which further includes a connecting member fixedly attached to said striking means, a stationary member disposed adjacent said connecting member, a connecting rod fastened at one end thereof to said stationary member, and a rotatable drive means coupled to the other end of said connecting rod, said connecting member being pivotally attached to said stationary member and driven thereabout by means of said connecting rod attached to said rotatable drive means.

20. A machine for harvesting cucumbers and the like attached by stems to vines having one end thereof rooted in the ground and the other end thereof being substantially free which comprises:
   a. means for engaging and lifting the vines into the machine;
   b. means for supporting the vines and the stems attached thereto as the cucumbers are being removed therefrom; and
   c. reciprocating means for cyclically striking the cucumbers as the stem attaching the cucumber is adjacent said supporting means, the striking of the cucumber causing the stem engaged with said supporting means to be peeled from the cucumbers.

21. A machine for harvesting cucumbers and the like according to claim 20 which includes means for conveying said cucumbers to a storage member.

22. A machine for harvesting cucumbers and the like according to claim 20 which includes means mounted on the machine forward of said conveying means for orienting the vines such that said free end thereof extends from said rooted end in a direction transverse to the movement of said machine.

23. A machine for harvesting cucumbers and the like according to claim 22 wherein said means for orienting the vines comprises a sweep attachment including a frame member having a plurality of resilient rollers mounted thereto, said resilient rollers having a plurality of indentations along the periphery thereof, and a rotatable drive means for rotating said rollers in a direction substantially transverse to said movement of said machine.

24. A machine for harvesting cucumbers and the like according to claim 23 which includes a lift means attached to said frame member whereby said rollers may be lifted above said ground.

25. A machine for harvesting cucumbers and the like according to claim 20 wherein said supporting means is angularly disposed from the line of movement of said machine and said striking means is positioned parallel thereto.

26. A machine for harvesting cucumbers and the like according to claim 20 which includes a storage member for collecting said cucumbers, said storage member being pivotally mounted whereby said cucumbers may be removed therefrom.

27. A method of operation of a machine for harvesting cucumbers and the like from vines while the machine is moved adjacent to the vines comprising the steps of:
   a. conveying the vines extending from the ground relative to the machine along a path of travel which is elevated above the ground at a speed relative to the machine substantially equal and opposite to the speed of the machine relative to the ground,
   b. passing the vines and the stems attached thereto over a support member extending at an angle to the path of travel of the machine as the vines and stems are being conveyed, and
   c. reciprocally striking the cucumbers as they are being conveyed in advance of the support member with the stems thereof in engagement with the support member to cause the cucumbers to be severed from the stems.

28. A method in accordance with claim 27 in which said step of conveying comprises lifting the vines from the ground and moving the vines rearwardly at a speed equal to the forward speed of the machine, whereby the vines are elevated by the passage of the machine.

29. A method in accordance with claim 27 in which said step of conveying the vines includes transporting the vines at a plurality of points by a plurality of endless belts spaced apart from one another and extending substantially parallel to the lines of travel of the conveying means.

30. A method in accordance with claim 29 in which said step of striking the cucumbers includes the cyclic application of force in a vertical descending direction against the body of the cucumber.

31. A method in accordance with claim 27 which includes the step of sweeping cucumbers adjacent to the root end of the vines so that the vines extend substantially transverse to the movement of the machine.

32. A method of operation of a machine for harvesting cucumbers and the like attached by stems to vines while the machine is moved adjacent to the vines comprising the steps of:
   a. engaging and lifting the vines into the machine;
   b. supporting the vines and the stems attached thereto as the cucumbers are removed therefrom; and
   c. reciprocally striking the cucumbers as the stem attaching the cucumber is adjacent the supporting means, said striking of the cucumber causing the stem engaged with the supporting means to be peeled from the fruit.

33. The method of claim 32 which further includes the step of conveying the harvested cucumbers to a storage member.

34. The method of claim 32 which includes orientating the vines into a uniform row extending substantially perpendicular to the direction of the path of the machine.

UNITED STATES PATENT OFFICE
CERTIFICATE OF CORRECTION

Patent No. 3,600,882      Dated August 24, 1971

Inventor(s) Bernard C. Eisenberg

It is certified that error appears in the above-identified patent and that said Letters Patent are hereby corrected as shown below:

On the Abstract page "Solbern Corporation" should be -- Solbern Corp. --

On the Abstract page "Kenyon & Kenyon and Reilly, Carr & Chapin" should be -- Kenyon & Kenyon Reilly Carr & Chapin --

Column 1, line 27, "ky" should be -- by --

Column 3, line 39, "70" should be -- 60 --

Column 3, line 72, "rearward" should be -- forward --

Column 4, line 35, "stem" should be -- stems --

Column 6, line 31, "paced" should be -- placed --

Column 7, line 47, after "therewith" the "," should be -- . --

Signed and sealed this 11th day of April 1972.

(SEAL)
Attest:

EDWARD M. FLETCHER, JR.
Attesting Officer

ROBERT GOTTSCHALK
Commissioner of Patents